United States Patent [19]

Harding et al.

[11] Patent Number: 5,601,237

[45] Date of Patent: Feb. 11, 1997

[54] ACTUATOR ASSEMBLY FOR AGRICULTURAL SPRAYERS

[75] Inventors: Richard D. Harding, Pearl; Neil M. Payne; James A. Trigg, both of Bolton, all of Miss.

[73] Assignee: Spray Saver Corporation, Pearl, Miss.

[21] Appl. No.: 417,136

[22] Filed: Apr. 4, 1995

[51] Int. Cl.$^6$ .................................................. B05B 1/20
[52] U.S. Cl. .................................... 239/166; 222/612
[58] Field of Search .............................. 239/172, 166, 239/146, 167, 168, 169; 222/504, 608, 610, 617; 200/61.62, 61.7, 61.45, 61.52

[56] References Cited

U.S. PATENT DOCUMENTS

| | | |
|---|---|---|
| 2,943,584 | 7/1960 | Palmer et al. . |
| 2,968,264 | 1/1961 | Schnell . |
| 3,031,983 | 5/1962 | Hanson . |
| 3,785,564 | 1/1974 | Baldocchi . |
| 3,905,523 | 9/1975 | Ahlers et al. . |
| 3,921,907 | 11/1975 | Anderson . |
| 4,116,138 | 9/1978 | McFarland et al. . |
| 4,883,626 | 2/1989 | Bachmann ............................ 239/172 |
| 5,125,576 | 6/1992 | Ziegenbein ........................... 239/113 |
| 5,168,264 | 12/1992 | Agustin .................................. 340/573 |
| 5,477,019 | 12/1995 | Dolling ................................. 200/61.52 |
| 5,504,287 | 4/1996 | Cable .................................... 200/61.52 |

Primary Examiner—Robert J. Oberleitner
Assistant Examiner—C. T. Bartz
Attorney, Agent, or Firm—Nixon & Vanderhye P.C.

[57] ABSTRACT

An actuator assembly is connectable to a lift arm of an agricultural vehicle to sense whether the lift arm is in a raised or lowered position and thereby responsively disable or enable the flow of agricultural chemicals to a spray head associated with the agricultural vehicle, respectively. The preferred actuator assembly includes a cylindrically-shaped annular support housing adapted to being connected to the lift arm and positioned in a substantially vertical mounting plane. A switch housing disc is nested within said annular support housing and may be turned relative thereto about an axis which is substantially normal to the mounting plane. A gravity-operated switch contained within the switch housing disc and disposed in a switch plane which is substantially perpendicular to said mounting plane for senses whether the lift arm is in its raised and lowered positions and, in response thereto, respectively disables and enables the flow of agricultural chemicals to the spray head associated with the agricultural vehicle. Gravity actuation of the switch is adjustable by selective turning movement of the switch housing disc which thereby angularly adjusts the switch plane in which the switch is disposed.

22 Claims, 3 Drawing Sheets

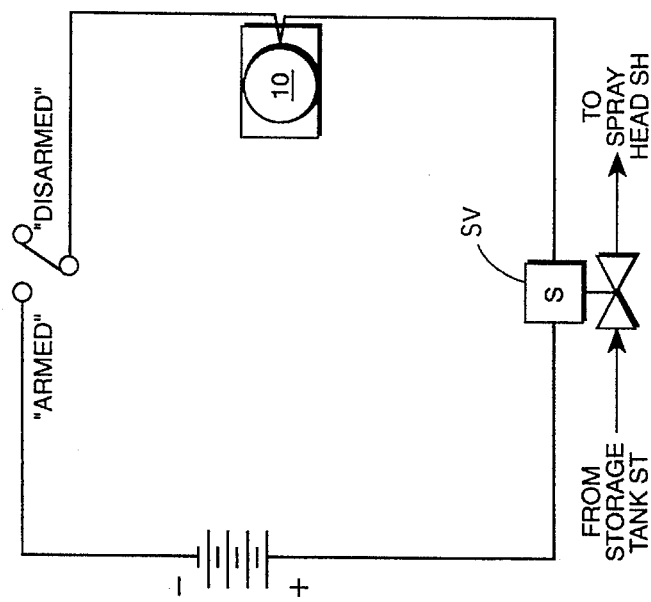
FIG. 5
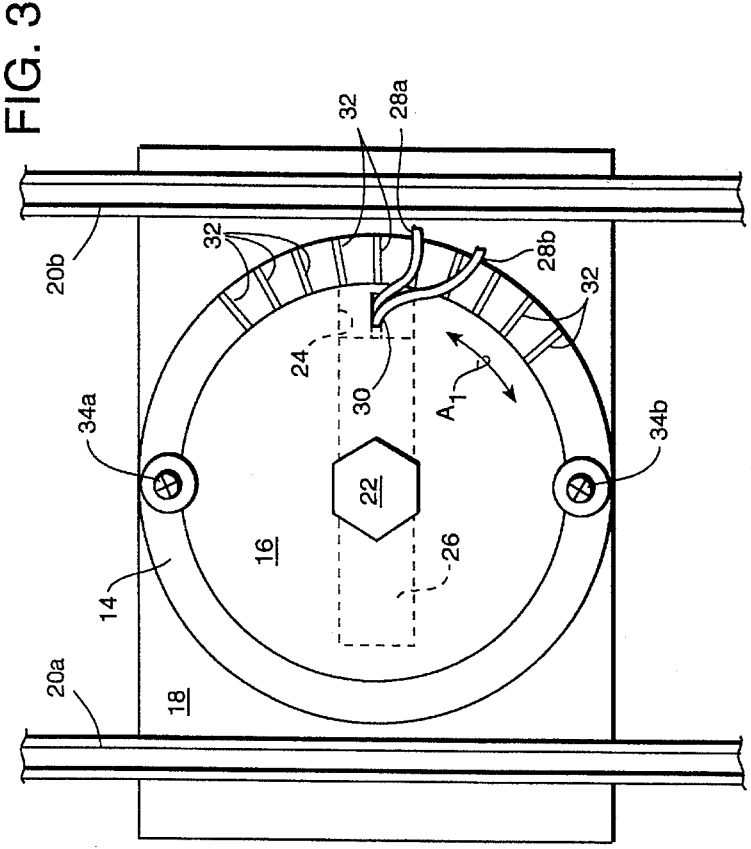
FIG. 3
FIG. 4

ACTUATOR ASSEMBLY FOR AGRICULTURAL SPRAYERS

FIELD OF INVENTION

The present invention relates generally to agricultural sprayers. In preferred forms, the present invention is embodied in an actuator assembly for agricultural spray implements which automatically disables the spray when the implement is raised, and enables the spray when the implement is lowered.

BACKGROUND AND SUMMARY OF THE INVENTION

Crop growers oftentimes have a need to apply liquid agricultural chemicals, such as pesticides, herbicides, fertilizers and the like to their growing crops. Typically, the application of agricultural chemicals to growing crops is accomplished by the use of spray implements propelled across the crop fields by an agricultural tractor.

Environmental-protection and cost-containment concerns require that agricultural chemicals be applied in controlled amounts to the growing crops. Thus, spray implements which are provided for the purpose of applying liquid agricultural chemicals to growing crops usually are provided with manually-actuated flow controls so that the tractor operator can stop/start the spray of agricultural chemicals as desired during the chemical application process. (See, U.S. Pat. Nos. 3,905,523 and 3,921,907, the entire content of each being incorporated hereinto expressly by reference.) However, since the flow control is separate from the lift arm control, tractor operators will sometimes forget to stop the spray of agricultural chemicals when making a turn onto a new crop row because the spray implement itself will usually need to be raised before the tractor turns. Also, the tractor operation may sometimes be late in starting the spray when starting the pass down the new crop row. In the former situation, excess agricultural chemicals will be applied to the environment, while in the latter situation not all of the growing crops will be treated by the agricultural chemicals.

According to the present invention, however, automated flow control of the agricultural chemical spray is provided in response to the spray implement being raised and lowered. Thus, according to the present invention, an actuator assembly is provided which senses whether the spray implement is in the raised or lowered position and, in response to such sensed position, disables or enables the flow of liquid agricultural chemical to the spray implement. Since tractor operators will raise the spray implement when making a turn onto a new crop row, and lower the spray implement as the tractor becomes aligned with the new crop row, the actuator assembly according to the present invention lessens the work load on the tractor operator during crop row turns since chemical spray flow control is actuated concurrently and automatically with operation of the spray implement. Thus, more efficient application of the agricultural chemicals results.

Further aspects and advantages of this invention will become more clear after careful consideration is given to the detailed description of the preferred exemplary embodiments thereof which follows.

BRIEF DESCRIPTION OF THE DRAWINGS

Reference will hereinafter be made to the accompanying drawings wherein like reference numerals throughout the various FIGURES denote like structural elements, and wherein;

FIG. 3 is a side elevational view of a preferred actuator assembly according to the present invention;

FIG. 4 is a front elevational view of the actuator assembly according to the present invention; and FIG. 5 is a schematic wiring diagram showing the actuator assembly in a preferred operative DC circuit.

DETAILED DESCRIPTION OF THE PREFERRED EXEMPLARY EMBODIMENTS

Figure 1:
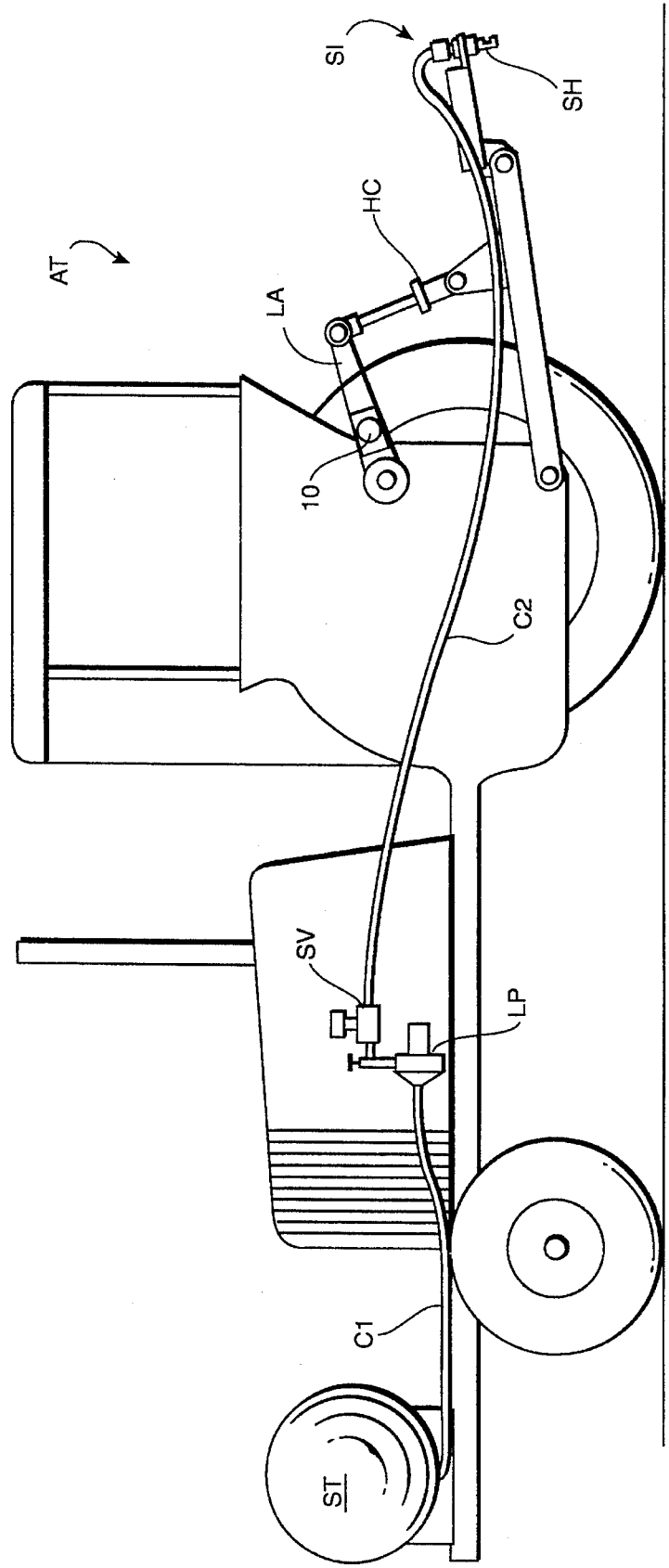
FIG. 1 is a schematic side elevational view showing an agricultural tractor equipped with a chemical spray implement and the actuator assembly according to the present invention.

Accompanying FIG. 1 shows in schematic fashion an agricultural tractor AT provided with a rearwardly extending lift arm LA to which an agricultural chemical spray implement SI is attached via hydraulic cylinder HC. The spray implement SI includes at least one spray head SH which is fluid-connected to a source of agricultural chemicals, such as the storage tank ST carried by the agricultural tractor AT at any convenient location (for example, forwardly as shown in FIG. 1). Specifically, the spray head SH is fluid-connected to the high pressure side (discharge) side of a liquid pump LP via conduit C1, while the storage tank ST is fluid connected to the low pressure (intake) side of the pump LP via conduit C2. The liquid pump LP may be electrically or mechanically driven (e.g., by the tractor's battery or by a power take-off from the tractor's power train).

A normally closed solenoid valve SV is connected in-line with conduit C2 and is controlled by means of the actuator assembly 10 according to this invention which is attached to the lift arm LA. Specifically, the actuator assembly 10 according to this invention is connected electrically to the solenoid coil of the solenoid valve SV in a DC circuit shown in FIG. 5. A manually activated on-off switch 12 is mounted in the cab unit of the tractor AT. When in the "disarmed" position, the switch 12 prevents the actuator assembly 10 from automatically activating chemical spraying during periods of nonuse (e.g., travel to/from the crop fields).

Figure 2A:
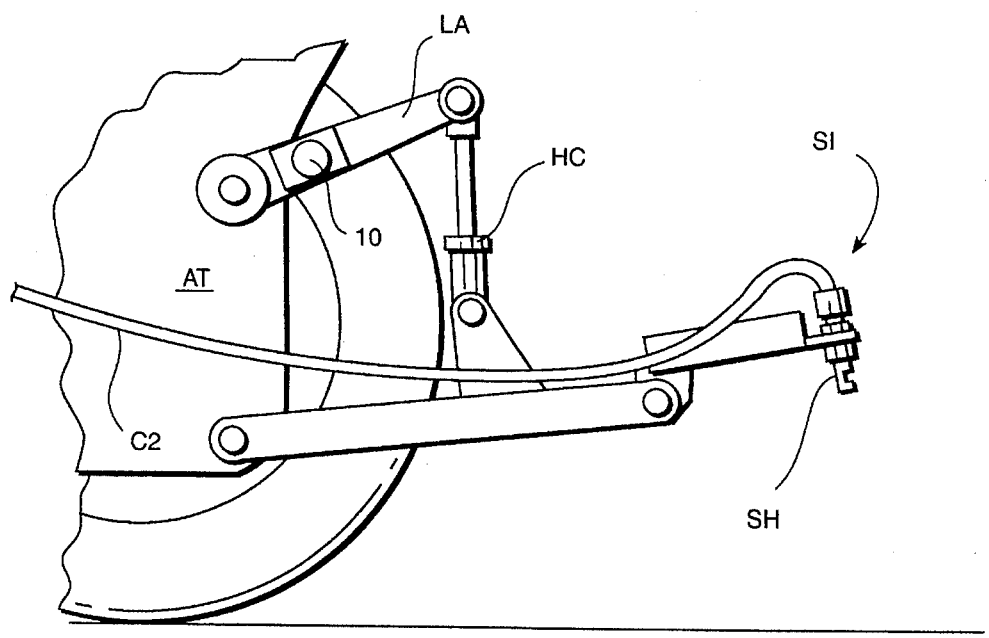
FIG. 2A is a detailed schematic elevational view showing the chemical spray implement associated with the agricultural tractor of FIG. 1 in a raised position.
Figure 2B:
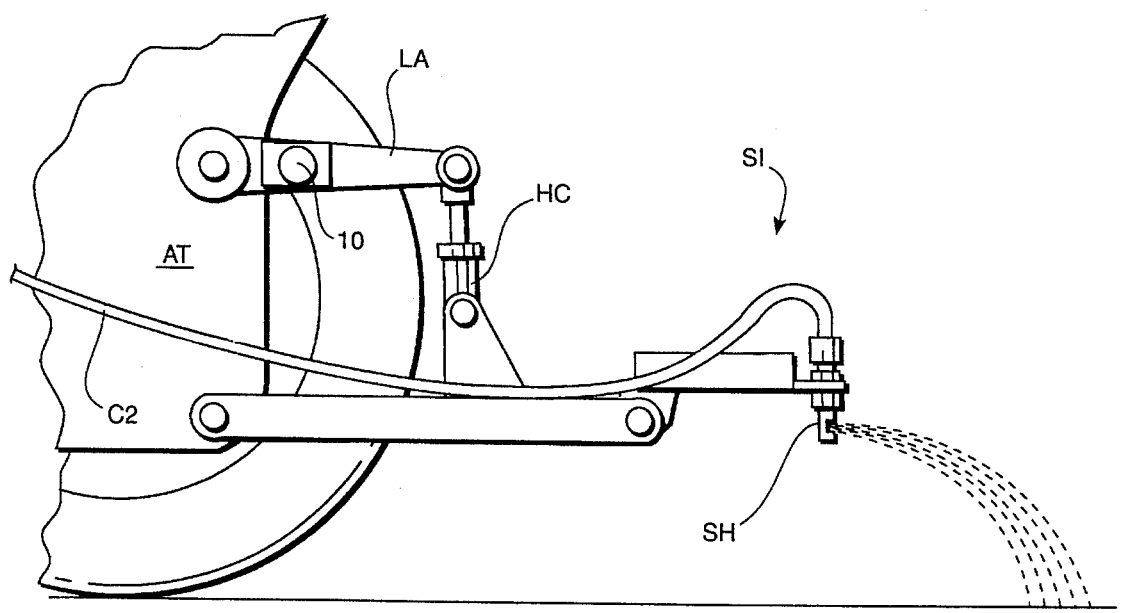
FIG. 2B is a detailed schematic elevational view similar to FIG. 2A, but showing the chemical spray implement in a lowered position.

Thus, with the switch 12 in the "armed" position, and with the lift arm LA in its raised position as shown in FIG. 2A, the flow of liquid from the storage tank ST will be interrupted by virtue of the actuator assembly opening the DC circuit causing the solenoid valve to close. When the lift arm LA is lowered as shown in FIG. 2B (as would occur when the tractor operator is ready to begin spraying a crop row), the actuator assembly will sense the lowered position and, in response, will close the DC circuit thereby energizing the solenoid valve SV and thereby allow chemical to again flow through conduit C2 to the spray head SH.

Accompanying FIGS. 3 and 4 depict a particularly preferred embodiment of the actuator assembly 10 according to the present invention. In this regard, the actuator assembly 10 is most preferably formed from a plastics material, such as polyethylene, nylon or the like. The actuator assembly generally includes a cylindrically-shaped annular support housing 14 and a conformably cylindrically-shaped switch housing disc 16 received within the support housing 14 for pivotal movements (arrow $A_1$) about a substantially horizontal axis (which axis $A_2$ is visible in FIG. 4, but which extends perpendicularly out of the plane of FIG. 3). The annular support housing 14 is rigidly affixed to (preferably unitarily formed with) a base plate 18 which serves as convenient structure to allow mounting of the actuator assembly 10 to the lift arm LA via tie-down straps 20a, 20b. Of course, other means to mount the actuator assembly 10 to the lift arm LA could be provided, such as, conventional nut and bolt assemblies passing through the base plate 18, adhesive or the like.

As noted briefly above, the switch housing disc 16 is received within the annular support housing 14 so as to allow for pivotal movements thereof about axis $A_2$. In order to assist in pivotally moving the switch housing disc 16, a lug 22 is integrally (preferably unitarily) formed centrally of the switch housing disc 16 to accept a turning tool such as a wrench.

The switch housing disc 16 is provided with an internal open-ended cavity 24 in which an elongate gravity-activated switch 26 is positioned. Virtually any switch that is gravity-activated may be employed in the practice of the present invention, such as mercury switches, ball bearing switches or the like. However, sealed mercury switches are presently preferred. The switch is positioned in a switch plane perpendicular to the switch housing disc 16 which contains the axis $A_2$ (i.e., in a plane passing through the axis $A_2$ perpendicular to the plane of FIG. 3 and aligned with the elongate axis of the switch 26).

The lead wires 28a, 28b from the switch 26 exit the switch housing disc 16 through pitch 30 which communicates with the internal cavity 24 and are; connected in the DC circuit in the manner shown in FIG. 5. The notch 30 thus serves as a pointer element which may be aligned with one of the angle notches or indicators (a few of which are identified by reference numerals 32) radially inscribed on the annular support housing 14. The indicators 32 may be angularly separated from one another by any preselected angular value, for example, 10°. Thus, in use, the actuator assembly 10 may be readily attached to a lift arm LA of the agricultural tractor AT so that the base support 18 is disposed in a substantially vertical mounting plane, with the switch housing 16 thereafter angularly adjusted for proper operation. That is, once the actuator assembly 10 is attached to the tractor's lift and LA, the switch housing disc 16 may be turned (arrow $A_1$) until the desired angular orientation of the elongate gravity-activated switch 26 relative to a horizontal reference plane perpendicular to the mounting plane is achieved (which angular orientation may be visually indicated by alignment of the notch 30 with one of the angular indicators 32).

The particular angular orientation of the switch housing 16, and hence the switch 26 will depend on a number of factors, including the angular orientation of the lift arm LA to which the assembly 10 is attached, the particular orientation/operation of the spray implement SI that may be used, terrain features of the crop field, or the like. Suffice it to say, however, that the angular orientation of the switch 26 is selected so that the flow of liquid chemical to the spray head SH is stopped and started in response to the lift arm being in its raised and lowered positions, respectively.

Once the desired angular orientation of the switch 26 has been obtained, the switch housing disc 16 may be positionally locked in place by retaining screw and washer lock assemblies 34a, 34b. That is, by tightening the screw and washer lock assemblies 34a, 34b, the switch housing assembly 16 will be immovably positioned relative to the annular support housing 14. If another angular orientation is desired, the screw and washer lock assemblies 34a, 34b may simply be loosened and the switch housing disc 16 pivoted until the desired angular orientation has again been achieved, at which the assemblies 34a, 34b are again tightened.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An actuator assembly for connection to a lift arm of an agricultural vehicle which senses whether the lift arm is in a raised or lowered position and in response thereto respectively disables or enables the flow of agricultural chemicals to a spray head associated with the agricultural vehicle, said actuator assembly comprising:

a cylindrically-shaped annular support housing adapted to being connected to the lift arm and positioned in a substantially vertical mounting plane;

a switch housing disc; and a gravity-operated switch contained within said switch housing disc and disposed in a switch plane which is substantially perpendicular to said mounting plane for sensing the lift arm in its raised and lowered positions and, in response thereto, respectively disabling and enabling the flow of agricultural chemicals to the spray head associated with the agricultural vehicle, wherein said switch housing disc is Coupled operatively to said annular support housing for turning movements about a generally horizontal axis to allow the switch housing to be adjustable through a range of angular orientations relative to a horizontal reference plane containing said axis so as to allow angular adjustment of said switch plane relative to said horizontal reference plane whereby gravity actuation of said switch is adjustable by selective turning movement of said switch housing disc which thereby angularly adjusts said switch plane in which said switch is disposed.

2. The actuator assembly as in claim 1, wherein said switch housing disc includes a tool lug for receiving a turning tool to assist in turning of said switch housing disc relative to said annular support housing.

3. The actuator assembly as in claim 1, wherein said annular support housing includes a plurality of angularly separated indicators for indicating angular orientation of said switch.

4. The actuator assembly as in claim 1, wherein said annular support housing includes a lock assembly which positionally locks said switch housing disc.

5. The actuator assembly as in claim 1, wherein said annular support housing and said switch housing disc are each formed of a plastics material.

6. The actuator assembly as in claim 1, wherein said switch housing disc includes an elongate open-ended central cavity in which said switch is positioned.

7. The actuator assembly as in claim 6, wherein said switch is one of a mercury switch or a ball bearing switch.

8. A system for controllably initiating flow of an agricultural chemical from a source thereof to an agricultural spray implement attached to a lift arm of an agricultural vehicle in response to the lift arm being lowered, and stopping the flow of the agricultural chemical in response to the lift arm being raised, said system comprising:

a solenoid valve disposed in a flow path of the agricultural chemical from said source thereof to the agricultural spray implement;

a switch operatively connected to said solenoid valve, said switch sensing movement of the lift arm of the agricultural vehicle between a raised position thereof and a lowered position thereof and operating said solenoid valve so as to respectively disable and initiate flow of the agricultural chemical along the flow path from the source thereof to the agricultural spray implement in response to such sensed movement;

a support housing for attachment to the lift arm of the agricultural vehicle; and a switch housing which houses said switch, said switch housing being coupled to said support housing for turning movements relative thereto, wherein said switch housing is coupled operatively to said support housing for turning movements about a generally horizontal axis to allow the switch housing to be adjustable through a range of angular orientations relative to a horizontal reference plane containing said axis so as to allow angular adjustment of said switch relative to said horizontal reference plane.

9. The system as in claim 8, wherein said switch housing disc includes an elongate open-ended central cavity in which said switch is positioned.

10. The system as in claim 9, wherein said switch is one of a mercury switch or a ball bearing switch.

11. The system as in claim 8, wherein said support housing includes an annular cylindrically shaped support, and wherein said switch housing is a cylindrical disc conformably shaped to said cylindrically shaped support.

12. The system as in claim 8, wherein said switch housing includes a tool lug for receiving a turning tool to assist in turning of said switch housing disc relative to said annular support housing.

13. The system as in claim 8, wherein said annular support housing includes a plurality of angularly separated indicators for indicating angular orientation of said switch.

14. The system as in claim 8, wherein said annular support housing includes a lock assembly which positionally locks said switch housing disc.

15. The system as in claim 8, wherein said annular support housing and said switch housing disc are each formed of a plastics material.

16. In an agricultural vehicle having a lift arm moveable between raised and lowered positions, a spray implement coupled to said lift arm, a source of liquid agricultural chemical, and a supply conduit fluid-connecting said source of liquid agricultural chemical to said spray implement, the improvement comprising an actuator assembly for controllably initiating flow of agricultural chemical from said spray implement in response to said lift arm being moved into said lowered position thereof, and for disabling the flow of agricultural chemical from said spray implement in response to said lift arm being moved into said raised position thereof, said actuator assembly including:

a solenoid valve disposed in said supply conduit between said source of liquid agricultural chemical and said spray implement;

a support housing attached to said lift arm of the agricultural vehicle;

a switch housing; and a switch mounted within said switch housing and operatively connected to said solenoid valve, said switch sensing movement of the lift arm of the agricultural vehicle from a raised position thereof and into a lowered position thereof and operating said solenoid valve so as to initiate flow of the agricultural chemical along the flow path from the source thereof to the agricultural spray implement in response to such sensed movement; wherein said switch housing is coupled operatively to said support housing for turning movements about a generally horizontal axis to allow the switch housing to be adjustable through a range of angular orientations relative to a horizontal reference plane containing said axis so as to allow angular adjustment of said switch relative to said horizontal reference plane.

17. In the agricultural vehicle as in claim 16, wherein said switch housing disc includes a tool lug for receiving a turning tool to assist in turning of said switch housing disc relative to said annular support housing.

18. In the agricultural vehicle as in claim 16, wherein said annular support housing includes a plurality of angularly separated indicators for indicating angular orientation of said switch.

19. In the agricultural vehicle as in claim 16, wherein said annular support housing includes a lock assembly which positionally locks said switch housing disc.

20. In the agricultural vehicle as in claim 16, wherein said annular support housing and said switch housing disc are each formed of a plastics material.

21. In the agricultural vehicle as in claim 16, wherein said switch housing disc includes an elongate open-ended central cavity in which said switch is positioned.

22. In the agricultural vehicle as in claim 21, wherein said switch is one of a mercury switch or a ball bearing switch.

* * * * *